Feb. 7, 1967     E. A. THOMPSON     3,302,923
TURBINE

Original Filed Sept. 28, 1962     5 Sheets-Sheet 1

INVENTOR.
EARL A. THOMPSON
BY
Ralph L. Tweedale
ATTORNEY

INVENTOR.
EARL A. THOMPSON
BY
Ralph L. Tweedale
ATTORNEY

Feb. 7, 1967  E. A. THOMPSON  3,302,923

TURBINE

Original Filed Sept. 28, 1962  5 Sheets-Sheet 5

INVENTOR.
EARL A. THOMPSON
BY
Ralph L. Twedale
ATTORNEY

United States Patent Office
3,302,923
Patented Feb. 7, 1967

3,302,923
TURBINE
Earl A. Thompson, 1300 Hilton Road,
Bloomfield Hills, Mich. 48020
Continuation of application Ser. No. 227,091, Sept. 28,
1962. This application Jan. 13, 1965, Ser. No. 426,475
16 Claims. (Cl. 253—2)

This is a continuation of my copending application S.N. 227,091 filed September 28, 1962, now abandoned, which was a continuation-in-part of its copending application S.N. 689,388 filed October 10, 1957, now abandoned.

Many devices require a prime mover operating at speeds in the neighborhood of 50,000 revolutions per minute and because of space limitations cannot be satisfactorily driven by prime movers available heretofore. For example, internal grinders for grinding small bores require a very high spindle speed. Where the prime mover is directly connected to the spindle, the commonly used integral electric motors have required the use of high frequency current necessitating a special generator, and have, furthermore, not been capable of producing as large an amount of power as it is desired. These difficulties are increased as the speed requirements increase.

Similar difficulties are encountered when an air turbine is used since it is difficult, within the space limitations, to provide enough power capacity at the high speeds.

Another method of driving internal grinder spindles utilizes a belt drive from a remotely positioned prime mover and these drives are also limited in their power transmitting ability as speed requirements increase because of the centrifugal force acting on the belt tending to hold it away from the spindle pulley and causing slippage.

It is an object of the present invention to provide an improved liquid turbine which is capable of driving a load device such, for example, as a grinding spindle, with a greatly increased power at ultra high speeds.

The use of a liquid driven turbine of conventional form presents serious design problems which have heretofore prevented the satisfactory use of turbines for high speed applications. Thus the rotor diameter must be kept small for high speed rotation due to the centrifugal force imposed on the material of the rotor and also because the high peripheral velocity of the rotor vanes requires correspondingly high fluid velocity at the entrance to the rotor. This necessitates a very small entry angle of the fluid flowing into the rotor which, with previous constructions, cannot be reduced to a low enough value and still have adequate area in the distributor passages to avoid unreasonable head losses therein.

Stated in another way, turbine designs of known types have been limited in their maximum speeds because a small diameter rotor, although it desirably reduces the peripheral vane velocity required, does not provide a solution because the distributor passages become too small to carry the required flow without dissipating most of the fluid energy in frictional losses.

It is an object of the present invention to provide an improved liquid turbine for efficient operation at ultra high speeds which overcomes these difficulties.

Another object is to provide a high speed liquid turbine having an improved regulator mechanism for maintaining substantially constant speed under variations in load.

Another object is to provide a high speed liquid turbine having an improved draft tube configuration to be compatible with the improved speed regulator mechanism.

Further objects and advantages of the present invention will be apparent from the following description, reference being had to the accompanying drawings wherein two forms of the present invention are illustrated, and wherein.

Figure 6:
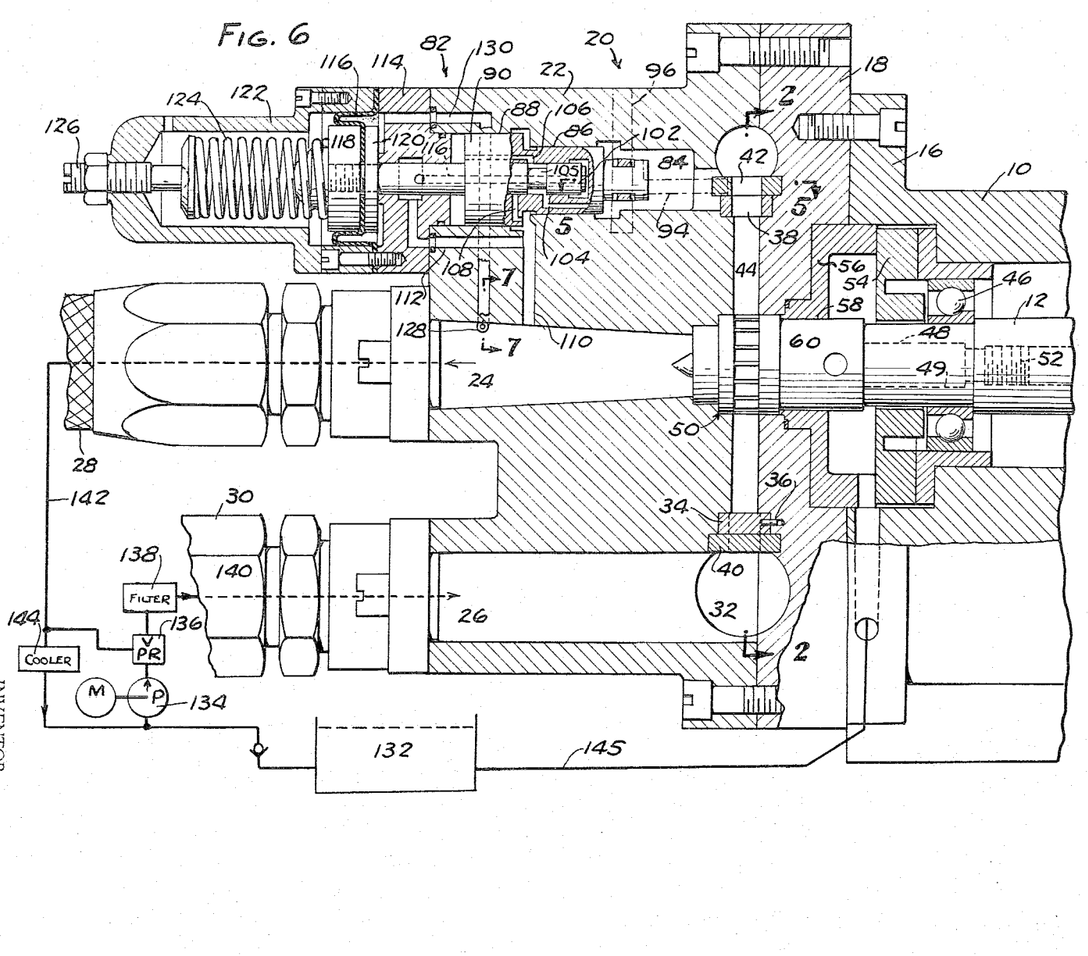
FIGURE 6 is a longitudinal sectional view of one form of the turbine and the regulating mechanism showing, diagrammatically, a source of driving liquid.

There is shown in FIGURES 1 through 15 one form of the present invention including a grinding wheel spindle comprising a bearing housing 10 having a spindle 12 journaled therein and carrying a grinding wheel 14. At its left end the housing 10 is flanged at 16 to receive the base plate 18 of a turbine casing, generally designated 20. Referring particularly to FIGURE 6, the casing 20 includes a body member 22 having a central axial exhaust passage 24 and a parallel axial inlet passage 26 to which fluid conduits 28 and 30 are coupled respectively.

Figure 1:
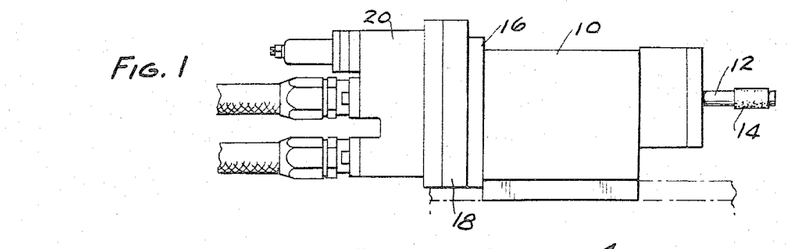
FIGURE 1 is a side view of an internal grinder spindle incorporating one form of the present invention.
Figure 2:
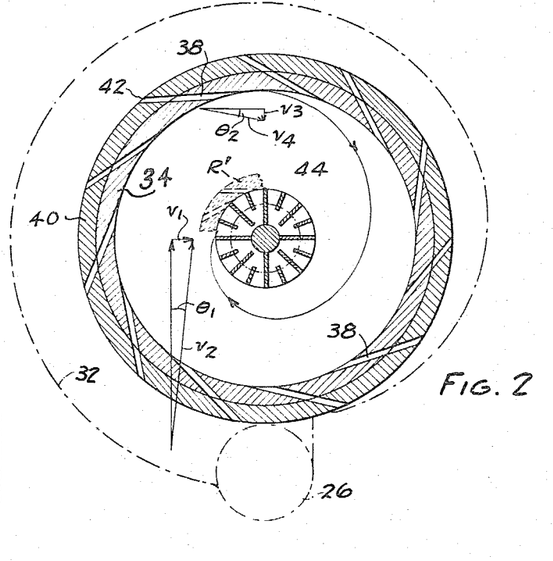
FIGURE 2 is a fragmentary sectional view taken on line 2—2 of FIGURE 6.

The inlet passage 26 extends rightwardly in FIGURE 6 to an inlet volute chamber 32, which is formed partly in the body 22 and partly in the base plate 18. The chamber 32 has a generally spiral configuration as shown in dotted lines in FIGURE 2. Rigidly mounted in grooves between the base plate 18 and the body 22 is a distributor or guide ring 34 which is secured against rotation by a pin 36. The distributor ring is provided with a plurality of tangential inlet guide passages or nozzles 38 as shown in FIGURE 2, these being of less width than the ring as shown in the upper portion of FIGURE 6, where the passage 38 is shown in conventionalized form as if it were radial, whereas it as actually tangential. Rotatably mounted in grooves in the body 22 and base plate 18 is a concentric throttle ring 40 which has a matching set of tangential passages 42.

Inwardly of the distributor ring 34, the walls of the base plate 18 and body 22 are spaced apart to provide a cylindrical vortex chamber 44 which, in the form illustrated, has an outer diameter of several times its inner diameter and which may be provided with flat parallel end walls as shown. It will be understood that the end walls may, if desired, be made either divergent or convergent toward the center as viewed in FIGURE 6.

Figures 8, 9, 10, 11, 12, 13, 14, 15:
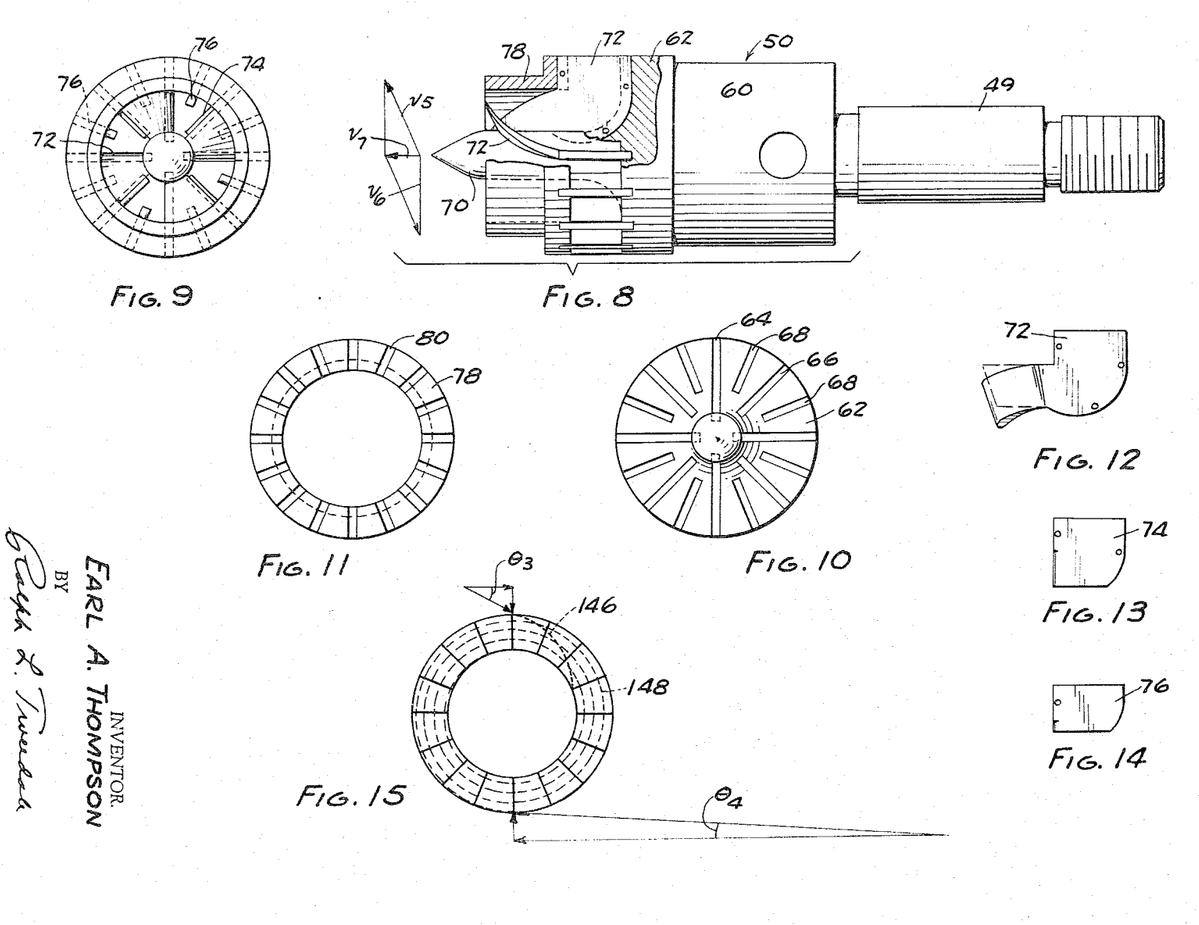
FIGURE 8 is a view of the turbine rotor with a portion broken away.
FIGURE 9 is an end view showing the fluid exit of the rotor.
FIGURE 10 is an end view of the rotor shaft prior to assembly of the vanes thereto.
FIGURE 11 is an end view of the rotor shroud without the vanes assembled.
FIGURE 12 is a perspective view of one of the longer vanes in the rotor.
FIGURE 13 is a view of one of the medium sized vanes in the rotor.
FIGURE 14 is a view of one of the smaller vanes in the rotor.
FIGURE 15 is a diagram of fluid flow in a rotor.

The spindle 12 is carried on bearings 46 and has at its left-hand end a bore 48 for the reception of the shank 49 of the turbine rotor 50, which is illustrated on a larger scale in FIGURE 8. The rotor 50 has a threaded engagement with the spindle 12 at 52. A spacer plate 54 and a spindle end cap 56 are mounted in the left-hand end of the spindle housing 10, with the cap 56 having an opening 58 through which the cylindrical body 60 of the rotor 50 extends.

Referring now to FIGURES 8 through 14, the structure of a rotor usable with either embodiment of the invention includes a body flange 62 which is provided with a number of radially extending vane slots 64, 66 and 68. Formed as an integral part of the flange 62 is a central bullet-shaped projection 70. The vane slots 64 extend into the face of the flange 62 and also into the wall of the bullet 70. The vane slots 66 extend only down part way to the bullet, while the slots 68 are still shorter.

The slots 64 have rigidly mounted therein a set of four large vanes 72. These are formed, as shown in FIGURE 12, and extend axially along the bullet 70 with a substantial helical curvature. The medium sized vanes 74 are generally rectangular in shape and extend radially inwardly to a point very close to the bullet, as shown in FIGURE 9. Intermediate these vanes the slots 68 carry the short vanes 76.

An exit shroud 78 comprises a flanged tube and is provided with a series of vane slots 80 which receive all of the previously described vanes. It is preferred to join the pieces of the rotor, including the body 60, the shroud 78 and the intermediate vanes, by an integral bonding process such as hydrogen brazing, or alternatively the rotor may be an integral casting of corresponding general shape. The exit shroud 78 is in aligned registration with the exhaust conduit 24 in the body 22.

For the purpose of regulating the supply fluid to the first form of the turbine in accordance with changes in load so as to minimize the speed variations in spindle 12, there is provided a speed regulator, generally designated 82, which is mounted in the upper part of the housing 22 in FIGURE 6. For this purpose the body 22 is provided with a flat hollow chamber 84 (see FIGURE 5) which is in open communication with the volute chamber 32. Intersecting the side wall of chamber 84 there is a stepped bore 86–88 (see FIGURE 6) within which a differential area servo-piston 90 is slidably mounted.

The piston 90 has a groove 92 on its right-hand end which receives the forked end of a lever 94 pivoted on a pin 96 which is stationarily positioned in the chamber 84. Imaginary projections of the lever and pin are shown by dot-dash lines in FIGURES 4 and 6. The lever 94 has an arm 98 which engages with a slot 100 in the throttle ring 40, the arrangement being such that motion of the piston 90 is transmitted through the lever 94–98 to shift the ring 40.

The right-hand end of piston 90 is exposed to the inlet pressure in volute 32 and chamber 84. The left-hand end of piston 90 is exposed to a variable pressure which is controlled by a three-way pilot valve 102 which is slidably mounted in an inner bore of the piston 90. A passage 104 in the piston 90 is controlled by the right-hand edge of a groove 105 on the spool 102 to selectively connect it with another internal passage 106 which leads to the left-hand end face of piston 90. A third passage 108 in the piston 90 is controlled by the left edge of the groove 105 to be selectively connected with and cut off from the passage 106. A body passage 110 connects between the exhaust passage 24 and the step chamber intermediate the bores 86 and 88. This passage has a branch 112 leading to an end cap 114 where the passage communicates with an internal passage 116 in the valve spool 102 leading to the right end thereof.

The pilot valve 102 has its stem connected on the left end with a flexible diaphragm 117 by means of threaded flanges 118 and 120. The periphery of the diaphragm 117 is clamped to the end cap 114 by a spring chamber 122. A spring 124 is inclosed in this chamber and abuts the flange 118 at its right-hand end. An adjusting screw 126 provides for adjusting the position of the left end of spring 124.

Figure 7:
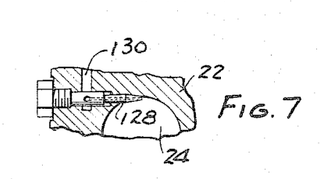
FIGURE 7 is a fragmentary sectional view on line 7—7 of FIGURE 6.

The left side of diaphragm 117 is exposed to atmospheric pressure through a suitable vent in the chamber 122, while the right-hand face of the diaphragm is exposed to pressure from a pitot tube located in the exhaust passage. The Pitot tube, as shown in FIGURE 7, may comprise a hollow, cone pointed screw 128 which is threaded into the body 22 and has its open end tangent to the outer periphery of exhaust passage 24. The hollow screw 128 communicates by a passage 130 in body 22 and end cap 114 with the right side of diaphragm 117.

As indicated in FIGURE 6, the fluid supply circuit may comprise a liquid tank 132 having a motor driven pump 134 provided with a relief valve 136 and a filter 138 and connected with a relief valve 140–30 with the inlet passage 26. The exhaust passage 24 communicates with the tank 132, with the pump inlet and with the relief valve outlet by conduit 28 and a return line 142 having a cooler 144 therein. The power supply elements shown diagrammatically in FIGURE 6, may be of any conventional form for the purpose of circulating power transmission fluid through the turbine. Line 145 drains rotor leakage.

The operation of the first form of the turbine, when all the conduits are filled with oil or other suitable operating liquid, is such that the fluid delivered by the pump 134 is directed into the volute chamber 32 and through the throttling ring passages 42 and the distributor passages 38. however, in distinction to previous designs, the turbine can run at very high speeds and deliver substantial amounts of power so as to build up a high head resistance against a moderate velocity of flow in the inlet passage 26. This comes about by reason of the action of the fluid in the vortex chamber 44 where a free vortex is formed. Under the well known constant-angle law of a free vortex, the peripheral velocity of the fluid varies inversely with the radius so that the fluid entering the radial passages in the rotor approaches with a very high circumferential speed, which is very close to the speed of the rotor itself. Thus a close approach to ideal tangential entry conditions is achieved and substantially all of the potential energy in the fluid which entered the volute chamber is available for reaction with the rotor vanes.

Figure 3:
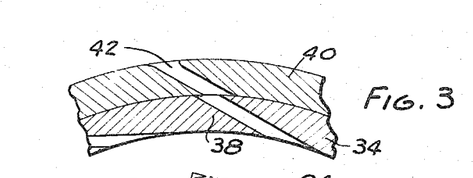
FIGURE 3 is a fragmentary view corresponding to FIGURE 2 showing the parts in a different position.
Figure 4:
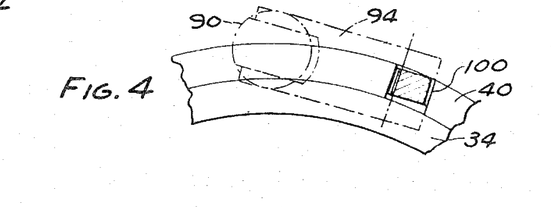
FIGURE 4 is a fragmentary sectional view taken on line 4—4 of FIGURE 5.
Figure 5:
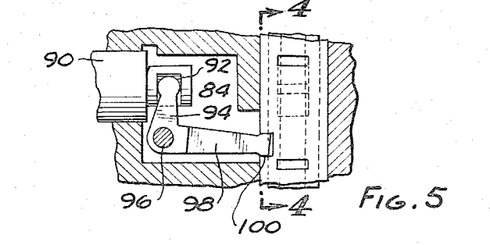
FIGURE 5 is a fragmentary sectional view taken on line 5—5 of FIGURE 6.

The regulation of the turbine is obtained by shifting the throttle ring 40 to change the area of the intersection of tangential passages 38 with passages 42. A partly closed condition is illustrated in FIGURE 3. The differential piston 90 is subjected on it right-hand end to the substantially constant pressure in the inlet volute chamber, while the larger area at the left end is subjected to a variable pressure controlled by the pilot valve 102 in the usual follow-up manner. The pilot valve is controlled in turn by the diaphragm 117 which senses changes in pressure appearing at the pilot tube 128. Since this tube is positioned to measure the residual spin in the discharge liquid, it will be seen that an increase or decrease in the spin will be reflected in a corresponding change in the pressure on the right-hand side of diaphragm 117, thus shifting the pilot valve 102 to position the throttle ring 40 according to the residual spin of liquid in the discharge chamber.

The advantages obtained by the present design in improving top speeds and torques may be seen from from the fact that the required velocity of flow in a radial direction at the entrance to the rotor, which is indicated at $v_1$ in FIGURE 2, may be chosen so as to have a reasonable value, having in mind the total discharge area from the rotor and the maximum axial discharge velocities which are desirable from the standpoint of low frictional losses.

One typical design based on a 22-gallon per minute flow with a discharge velocity of 19 feet per second may have a rotor of approximately 1 inch external diameter with approximately ¾ inch diameter discharge opening around a ¼ inch diameter bullet. With about ¼ inch of axial liquid space in the rotor and vortex chamber and 16 vanes 1/16 inch thick, a value for $v_1$ of 12 feet per second is indicated from the assumed discharge velocity. As previously explained, it is desired to have a high peripheral speed of the rotor rim and if the rotor of the diameter chosen is to rotate at high speed, then the angle $\theta$ must be small. Typical figures for a rotor speed of 40,000 revolutions per minute would require a value for $v_2$ of 175 feet per second and an angle $\theta$ of 4°.

By conventional design methods, a distributor guide means closely surrounding the rotor would lead to extremely small guide passages for the volume of fluid handled. This would result in very turbulent flow with high frictional loss of head through the distributor guide passages leaving little energy for driving the rotor. Since, under the free vortex law the angle $\theta$ remains constant throughout the radial extent of the vortex chamber, it will be seen that the fluid leaving the distributor passages 38 must have a radial velocity component $v_3$, which is related to its absolute velocity $v_4$ in the same triangular relationship, with the angle $\theta_2$ having the same value of 4°. Due to the larger area which may be designed into the passages 38 at their particular location radially, that is, in the example shown, at about three times as large a radius, the same amount of fluid may be handled at only 4 feet per second in the direction $v_3$ and with an absolute fluid velocity of around 58 feet per second for $v_4$. Thus the passages 38-42 may be designed to supply the required volume at this reasonable maximum lineal velocity through the passages, keeping below the critical Reynold's number for turbulent flow and keeping frictional head losses within feasible limits.

There is illustrated in FIGURE 15 a theoretical diagram of two optional fluid paths through a rotor, such as that of the present invention, showing the difference between the use of a conventional large angle $\theta_3$ and a smaller angle $\theta_4$. With the large $\theta_3$ a fluid particle will take the absolute path indicated by the dotted line 146 wherein the particle is in energy transferring relation to the rotor through something less than ¼ of a revolution. Also the tangential velocity component is not much greater than the radial. In contrast to this, the low angle $\theta_4$ causes each particle of fluid to remain in working engagement with the rotor through several revolutions, as shown at 148, and thus to transfer energy to the rotor for as long a time inerval as in the conventional design. Thus the reaction effect is not reduced in spite of the much higher peripheral velocity of the rotor, and it is, in fact, determined entirely by the radial component of velocity the same as if the rotor were turning more slowly.

Another distinct advantage of the present invention lies in the ability to utilize a source of fluid flowing into the turbine at reasonable velocity and with a substantially high pressure for the purpose of delivering its energy content efficiently to a small diameter rotor turning at very high speed. In order to efficiently couple the stream of fluid with the rotor, it is necessary that most of the static pressure head (e.g., 205 p.s.i.) present in the incoming fluid be converted to velocity head efficiently and at an absolute velocity commensurate with the rim velocity of the rotor (e.g., 175 feet per second). This is accomplished by converting only a small part of the static head to velocity head at the distributor ring (e.g., about 23.5 p.s.i.) and performing the major conversion (e.g., about 181.5 p.s.i.) in the free vortex chamber where it may be done efficiently. Thus the occurrence of substantial frictional losses during flow through the distributor ring is prevented and the majority of the energy of the fluid is available at the rotor and efficiently utilized there.

The regulation of speed will be seen to depend, in the present device, upon the velocity components in the liquid leaving the tips of the large rotor vanes 74. Ideally this flow will be in a true axial direction under optimum speed, load and head conditions, although this condition need not be achieved in actual practice. As shown in the velocity diagram in FIGURE 8, the vector $v_5$ may represent the relative velocity in the exit fluid with respect to the vane 72, and the vector $v_6$ represents the vane velocity. The resultant vector $v_7$ represents the absolute velocity of the exit fluid. Its direction will vary with changes in the vane velocity $v_6$, thus causing the residual spin to vary which is reflected at the Pitot tube 128.

The changes in pressure, which are detectable at the Pitot tube, are of small magnitude and it is desirable to avoid pressure changes due to other influences. For this reason the hydraulic supply and return circuit is arranged, as shown in FIGURE 6, so that the constant resistance of the cooler 144 is subjected to a constant rate of flow regardless of the amount of fluid by-passed by the relief valve 136. Thus the back pressure imposed by the cooler 144 does not vary with opening or closing of relief valve 136.

Figure 16:
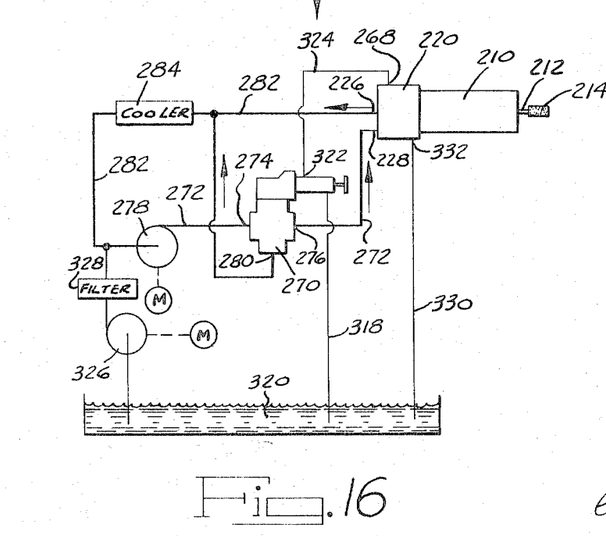
FIGURE 16 is a diagrammatic view of another form of turbine and its source of driving liquid.
Figure 17:
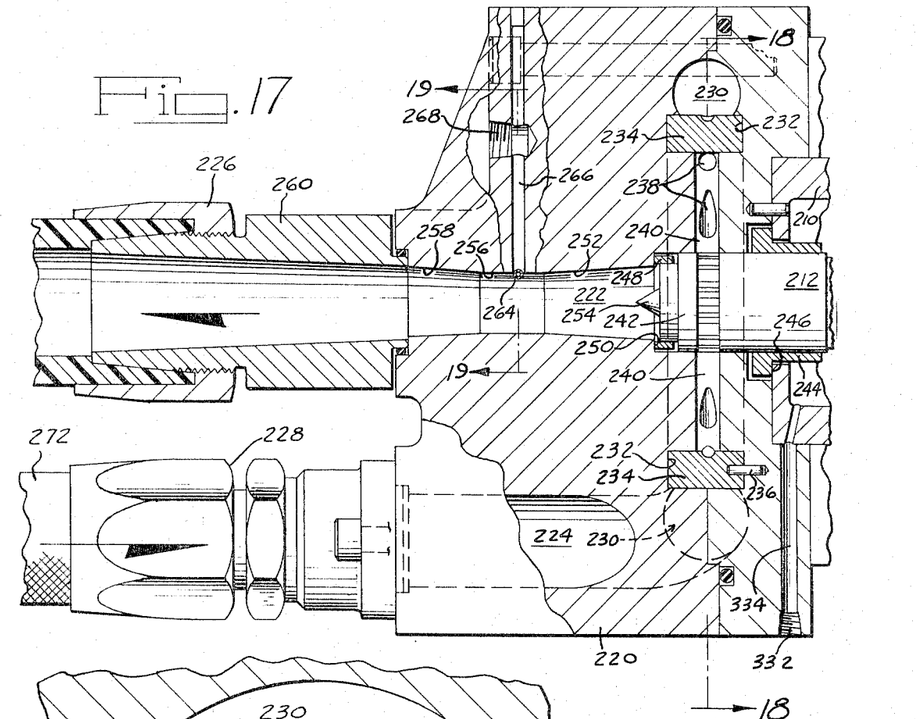
FIGURE 17 is a longitudinal sectional view of the other form of the turbine.
Figure 18:
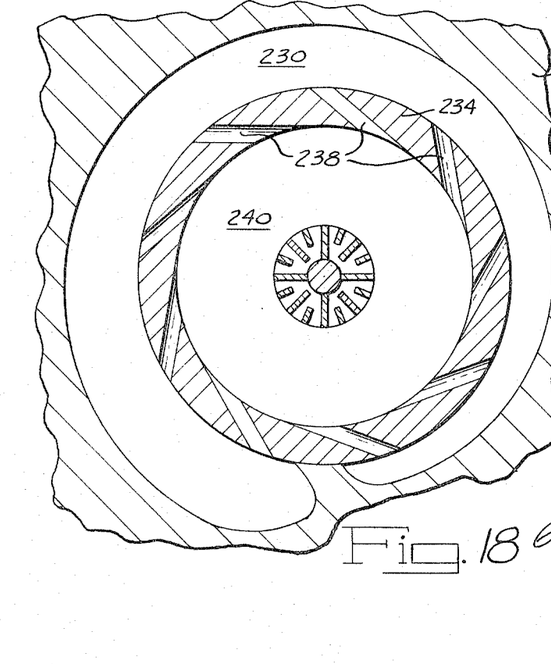
FIGURE 18 is a sectional view taken on line 18—18 of FIGURE 17.
Figure 19:
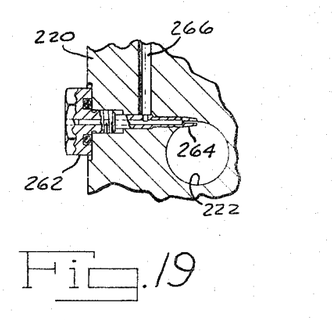
FIGURE 19 is a sectional view taken on line 19—19 of FIGURE 17.

There is shown in FIGURES 16 through 20 another form of the present invention. This may include a grinding wheel spindle comprising a bearing housing 210 having a spindle 212 journaled therein and carrying a grinding wheel 214. At its left end the housing 210 is constructed to receive a turbine casing 220. Referring particularly to FIGURE 17, the casing 220 includes a central axial exhaust passage 222 and a parallel axial inlet passage 224 to which are joined fluid connections 226 and 228, respectively.

The inlet passage 224 extends rightwardly in FIGURE 17 to an inlet volute chamber 230 formed in the turbine casing. This inlet 230 has a generally spiral configuration clearly visible in FIGURE 18. Rigidly mounted in grooves 232 in the turbine casing is a distributor or guide ring 234 secured against rotation by a pin 236. The distributor ring is provided with a plurality of generally tangentially disposed nozzles 238, which may be straight cylindrical holes drilled in the guide or distributor ring, and the diameter of which may determine the resistance of the turbine to driving fluid.

Inwardly of the distributor ring 234, the walls of the casing 220 are spaced apart to provide a cylindrical vortex chamber 240 which, in the form illustrated, has an outer diameter of several times its inner diameter and which may be provided with flat parallel end walls extending transverse to the turbine axis. It will be understood that the transverse end walls may, if desired, be made either divergent or convergent toward the center as viewed in FIGURE 17.

The spindle 212 has at its left-hand end a turbine motor 242. Leakage is prevented to the right of the rotor toward the grinding wheel spindle by a flanged bushing 244 closely surrounding the spindle 212 but having a loose outer radial clearance with the casing. Fluid pressure thus causes the bushing to seal where its flat shoulder 246 contacts the mating wall of the spindle housing 210. Leakage is prevented in the other direction by a similar bushing 248 urged against a shoulder 250 in the casing. The loose outer radial clearance of the two bushing seals allows the rotor 242 itself to be self-centering in the close-fitting mating bore in the turbine housing. The structure of the rotor may be similar to the rotor described in FIGURES 8 through 14 in connection with the first embodiment of this invention, and a repeated description thereof would serve no useful purpose. The vanes of the rotor are arranged for radial ingress and axial egress of driving fluid spiralling inwardly in the free vortex chamber 240.

The outlet passage 222 of the turbine initially forms a converging portion 252 around the bullet-shaped exit cone 254 of the rotor until the exit passage approximately equals in cross sectional area the outlet area of the rotor. Then, the passage 222 forms a straight walled or cylindrical portion 256 for an axial distance sufficient that the exiting liquid flows in even, laminar flow without turbulence or eddy currents along the passage walls. Finally, the passage flares out slightly in the manner of a conventional draft tube 258. This latter portion may be further extended by means of an intermediate coupling 260 upon which the outlet plumbing connection 226 is threaded.

Within the straight portion 256 of the outlet passage 222 is a Pitot tube 262 positioned tangentially transverse thereto. The Pitot tube may comprise a hollow, cone pointed screw 264 which is threaded into the casing. The hollow screw communicates by a plugged passage 266 in the casing with a plumbing connection 268. The Pitot tube is positioned to detect the residual rotary or spin component of the turbine fluid leaving the rotor.

Figure 20:
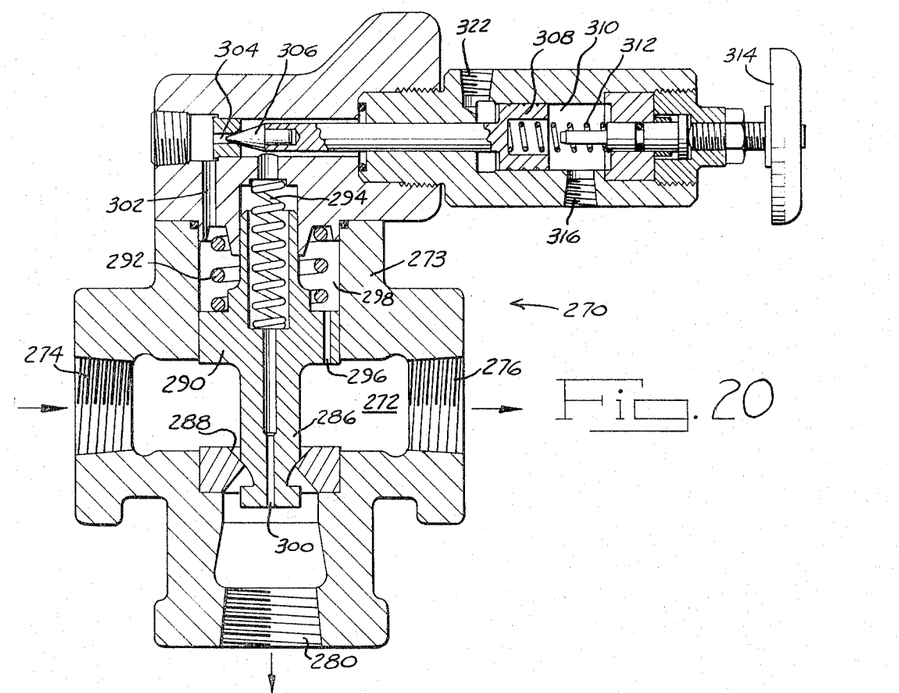
FIGURE 20 is a sectional view of the speed regulating mechanism for the other form of the turbine.

For the purpose of regulating the supply of fluid to the second form of the turbine in accordance with changes in load so as to minimize the speed variations in spindle 212, there is provided a speed regulator, generally designated 270, which is mounted in the input passage or line 272. The speed regulator may comprise a modulating relief valve for diverting fluid from a primary passage to a by-pass passage.

The valve may comprise a housing 273 having fluid connections 274 and 276 joining it with the input line 272 extending from a power driven pump 278 to the input connection 228 of the turbine. A third connection 280 in the valve joins the line 272 with a return line 282 extending from the outlet connection 226 of the turbine to the input zone of the pump 278, a cooler 284 being included in the return line if desired.

Within the valve body 273, a valve member 286 is normally biased downwardly against a conical seat 288 by a piston 290 loaded by a primary spring 292 and a secondary spring 294 to close the by-pass via connection 280. The piston 290 includes an orifice bleed passage 296 which slowly allows the pressure in the chamber 298 behind the piston to equal the pressure in the input passage 272. The piston and valve member further includes a passage 300 therethrough communicating at its lower end with the low pressure in the fluid return line 282.

In the upper portion of the valve body, a passage 302 connects the chamber 298 with another bleed orifice 304. A needle valve 306 is normally shifted to the left by a piston 308 biased in one direction in a cylinder 310 by a spring 312, the tension of which may be adjusted by a threaded spring seat 314. A connection 316 at the right-hand end of cylinder 310 communicates with a line 318 draining leaked fluid to the atmospheric reservoir 320. A connection 322 at the other end of the cylinder 310 communicates with a line 324 connected with the connection 268 of the turbine to sense Pitot tube pressure. When the needle valve 306 is moved to the right by increased Pitot tube pressure in the cylinder 310, the chamber 298 will be connected with the low pressure return line 282 via the passages 302, 304 and 300, as can be understood. When the pressure in the chamber 298 behind the piston 290 is thus reduced, the pressure in the turbine input line 272 will be sufficient to overcome the valve seating spring 292 and move the valve member 286 upwardly allowing fluid to by-pass the turbine 220 and circuit directly back to the pump 278. As the turbine consequently slows down, reduced Pitot tube pressure allows the needle valve 306 to move leftwardly and close, thus allowing pressure behind the piston 290 to increase via the orifice 296 until the valve 286 is moved downwardly to close.

As indicated in FIGURE 16, the fluid supply circuit may comprise the reservoir 320 from which fluid is pumped by a motor driven pump 326 to the main circuit, a filter 328 being placed between the pump 326 and the main circuit if desired. The power supply elements shown diagrammatically in FIGURE 16 may be of any conventional form for the purpose of circulating power transmission fluid through the turbine. Line 330 connects at 332 with a passage 334 in the turbine housing 220 to drain rotor leakage past the floating pressure seal 244.

The operation of the second form of the turbine, when all the conduits are filled with oil or other suitable operating liquid, is such that the fluid delivered by the pump 278 is directed through the regulator valve 270 and into the volute inlet chamber 230 and through the nozzles 238 of the distributor ring 234. However, in distinction to previous designs, the turbine can run at very high speeds and deliver substantial amounts of power so as to build up a high head resistance against a moderate velocity of flow in the inlet passage 224. This comes about by reason of the action of the fluid in the vortex chamber 240 where a free vortex is formed. Under the well known constant-angle law of a free vortex, the peripheral velocity of the fluid varies inversely with the radius so that the fluid entering the radial passages in the rotor approaches with a very high circumferential speed, which is very close to the speed of the rotor itself. Thus a close approach to ideal tangential entry conditions is achieved and substantially all of the potential energy in the fluid which entered the volute chamber is available for reaction with the rotor vanes.

The regulation of the turbine is obtained by shifting the valve member 286 in the regulator valve 270 to govern the flow of turbine liquid entering the free vortex chamber. A reduction of the load on the turbine, such as at the end of each grinding cycle, causes speeding up of the turbine with a resultant change in the residual rotary component of liquid in the exhaust passage 222 leaving the rotor vanes. Such a change increases the Pitot tube pressure on the left-hand face of the needle valve piston 308, opening the needle valve and causing the main valve member 286 to open with a modulating motion. With pressure fluid thus diverted back to the pump 278 without going through the turbine, the turbine will not attain undesirably excessive speeds. As it stays near its desired speed, the valve 286 responsive to Pitot tube pressure and thus to the speed of the grinding wheel tool 214 itself, governs or controls the flow of fluid to the free vortex chamber.

The advantages of the second form of turbine in regard to speed and torque are similar to the ones explained above in connection with the first form of turbine of this invention. Repetition thereof at this point would serve no useful purpose. The differences in the two forms of turbine and related speed controls merely point out the range of equivalent structures embraced by the basic concepts of this invention.

It will thus be seen that the present invention provides a turbine in which ultra high operating speeds may be achieved successfully with the development of substantial amounts of power. Furthermore this is obtained by a fluid directing structure making use of a free vortex to greatly increase the rotational speed of the fluid prior to entering the rotor and at the same time avoiding the high frictional head losses inherent in previous types of turbine devices.

While the forms of the invention as herein disclosed are preferred forms, it is to be understood that other forms might be adopted, all coming within the scope of the claims which follow.

I claim:

1. A turbine for driving a shaft at high speed from high pressure, low velocity liquid comprising means defining a ring-shaped inlet chamber for liquid, a rotor having a diameter less than one-half that minimum dimension of the inlet chamber which is transverse to its axis connected to drive the shaft and provided with drive vanes arranged for radially inward ingress and generally axial egress of driving liquid, means defining a free vortex chamber between the inlet chamber and the rotor including a pair of opposed end walls extending transverse to the rotor axis for axially confining a ring of liquid having the spiral motion of a free vortex to increase substantially the velocity of liquid entering the rotor over the velocity of liquid leaving the inlet chamber, means for measuring the rotary component of velocity of liquid leaving the rotor drive vanes, and means responsive to the value of the component for controlling the liquid entering the free vortex chamber.

2. A turbine for driving a shaft at high speed from high pressure, low velocity liquid comprising means defining an inlet volute chamber for liquid, a rotor having a diameter less than one-half that minimum dimension of the inlet volute chamber which is transverse to its axis connected to drive the shaft and provided with drive vanes arranged for radially inward ingress and generally axial egress of driving liquid, means defining a cylindrical free vortex chamber communicating between the inlet volute chamber and the rotor including a pair of parallel end walls perpendicular to the rotor axis for axially confining an annular disc of hydraulic medium having the spiral motion of a free vortex to increase substantially the velocity of liquid entering the rotor over the velocity of liquid leaving the volute chamber, a Pitot tube positioned to measure the rotary component of velocity of liquid leaving the rotor drive vanes, and means responsive to the value of the component for controlling liquid entering the free vortex chamber.

3. A system for driving a high speed rotating tool comprising a turbine rotor connected to rotate the tool, the rotor having drive vanes arranged for radially inward ingress and generally axial egress of driving liquid, a pair of opposed end walls extending transverse to the rotor axis to define an annular open vortex chamber extending radially outward from the rotor to a minimum diameter at least twice the rotor diameter, passage means connected to conduct liquid at relatively low velocity and with high pressure energy to the outer periphery of the vortex chamber and deliver it thereinto in a generally tangential direction and means for delivering to the passage means a continuous supply of liquid at high pressure and low velocity whereby pressure energy in the liquid is transformed to velocity energy in the vortex chamber to operate the rotor for driving the rotating tool at high speed.

4. A system for driving a high speed rotating tool comprising a turbine rotor connected to rotate the tool, the rotor having drive vanes arranged for radially inward ingress and generally axial egress of driving liquid, a pair of opposed end walls transverse to the rotor axis defining an annular open vortex chamber extending radially outward from the rotor to a diameter at least twice the rotor diameter, power driven pump means for generating pressure energy in driving liquid, passage means connected to conduct the liquid at relatively low velocity and with high pressure energy from the pump means and deliver it generally tangentially into the outer periphery of the vortex chamber whereby pressure energy of the driving liquid is transformed to velocity energy in the vortex chamber to drive the rotor, and means responsive to the tool speed connected to govern the flow of liquid into the vortex chamber.

5. A system for driving a high speed rotating tool comprising a turbine rotor connected to rotate the tool, the rotor having drive vanes arranged for radially inward ingress and generally axial egress of driving liquid, means including a pair of opposed end walls transverse to the rotor axis defining an annular free vortex chamber extending radially outward from the rotor to a diameter at least twice the rotor diameter, recirculating means for supplying driving liquid including power driven pump means for generating pressure energy in the liquid, first passage means connected to conduct the liquid at a relatively low flow rate and with high pressure energy from the pump means and deliver it generally tangentially into the outer periphery of the free vortex chamber, and second passage means connected to conduct the liquid at the same relatively low flow rate and with reduced energy from the rotor to the pump means whereby recirculating liquid has pressure energy transformed in the free vortex chamber into velocity energy to operate the rotor with a consequent transfer of such velocity energy to the turbine.

6. A liquid-driven turbine for driving a shaft comprising means defining a ring-shaped inlet chamber for liquid, a rotor having a diameter less than one-half that minimum dimension of the inlet chamber which is transverse to its axis connected to drive the shaft and provided with drive vanes arranged for radially inward ingress and generally axial egress of driving liquid, means defining a free vortex chamber communicating between the inlet chamber and the rotor including a pair of opposed end walls extending transverse to the rotor axis for axially confining a ring of liquid having the spiral motion of a free vortex, means defining an outlet passage extending in a generally axial direction to conduct liquid away from the rotor, the passage including a draft tube portion downstream of the rotor and a swirl sensing portion between the rotor and the draft tube portion, the swirl sensing portion having a generally constant area for an axial distance sufficient to reduce turbulence therein, and a Pitot tube positioned to measure rotary component of motion of liquid in the swirl sensing portion of the outlet passage.

7. The combination with liquid at high pressure and low velocity with a turbine driven by the liquid for driving a shaft at high speed, the turbine comprising means defining a ring shaped inlet chamber for liquid, a rotor having a diameter less than one-half that minimum dimension of the inlet chamber which is transverse to its axis connected to drive the shaft and provided with drive vanes arranged for radially inward ingress and generally axial egress of driving liquid, means defining a free vortex chamber between the inlet chamber and the rotor including a pair of opposed end walls extending transverse to the rotor axis for axially confining a ring of liquid having the spiral motion of a free vortex to increase substantially the velocity of liquid entering the rotor over the velocity of liquid leaving the inlet chamber, means for measuring the rotary component of velocity of liquid leaving the rotor drive vanes, and means responsive to the valve of the component for controlling the liquid entering the free vortex chamber.

8. The combination with liquid at high pressure and low velocity with a turbine driven by the liquid for driving a shaft at high speed, the turbine comprising means defining an inlet volute chamber for liquid, a rotor having a diameter less than one-half that minimum dimension of the inlet volute chamber which is transverse to its axis connected to drive the shaft and provided with drive vanes arranged for radially inward ingress and generally axial egress of driving liquid, means defining a cylindrical free vortex chamber communicating between the inlet volute chamber and the rotor including a pair of parallel end walls perpendicular to the rotor axis for axially confining an annular disc of hydraulic medium having the spiral motion of a free vortex to increase substantially the velocity of liquid entering the rotor over the velocity of liquid leaving the volute chamber, a Pitot tube positioned to measure the rotary component of velocity of liquid leaving the rotor drive vanes, and means responsive to the value of the component for controlling liquid entering the free vortex chamber.

9. A hydraulic turbine for driving a shaft at high speed from a high pressure low velocity liquid supply, said turbine comprising means defining a ring shaped liquid inlet chamber having an inner annular wall, said wall being provided with a nozzle means, a rotor having a diameter of less than one-half the diameter of the inner annular wall and connected to said drive shaft for rotation therewith, and means defining an annular vortex chamber between the annular wall and the periphery of the rotor the entire space of which vortex chamber is unobstructed and free of stator structure, said last mentioned means including a pair of parallel substantially flat axially spaced walls defining the ends of said vortex chamber said rotor having vanes provided with leading edges adjacent the inner periphery of said vortex chamber to receive the freely flowing driving liquid directly therefrom, and said rotor having trailing edges for egress of the driving liquid substantially axially from the rotor, said nozzle means supplying liquid to said vortex chamber with a rotary momentum whereby a confined ring of liquid with a spiral motion of vortex flow is produced between said axially spaced end walls, said liquid engaging in its radial inward movement the leading edges of said vanes to rotate said rotor and to be axially discharged therefrom.

10. A hydraulic turbine for driving a shaft at high speed from a high pressure low velocity liquid supply, said turbine comprising means defining a ring shaped liquid inlet chamber having an inner annular wall, said wall being provided with a nozzle means, a rotor having a diameter of less than one-half the diameter of the inner annular wall and connected to said drive shaft for rotation therewith, and means defining an annular vortex chamber between the annular wall and the periphery of the rotor the entire space of which vortex chamber is unobstructed and free of stator structure, said last mentioned means including a pair of parallel substantially flat axially spaced walls defining the ends of said vortex chamber, said rotor having vanes provided with leading edges adjacent the inner periphery of said vortex chamber to receive the freely flowing driving liquid directly therefrom, and said rotor having trailing edges for egress of the driving liquid substantially axially from the rotor, said nozzle means including a plurality of generally tangential passages for supplying liquid to said vortex chamber in generally tangential directions whereby a confined ring of liquid with a spiral motion of vortex flow is produced between said axially spaced end walls, said liquid engaging in its radial inward movement the leading edges of said vanes to rotate said rotor and to be axially discharged therefrom.

11. A hydraulic turbine for driving a shaft at high speed from a high pressure low velocity liquid supply, said turbine comprising means defining a ring shaped liquid inlet chamber having an inner annular wall, said wall being provided with a nozzle means, a rotor having a diameter of less than one-half the diameter of the inner annular wall and connected to said drive shaft for rotation therewith, means defining an annular vortex chamber between the annular wall and the periphery of the rotor the entire space of which vortex chamber is unobstructed and free of stator structure, said last mentioned means including a pair of parallel substantially flat axially spaced walls defining the ends of said vortex chamber, said rotor having vanes provided with leading edges adjacent the inner periphery of said vortex chamber to receive the freely flowing driving liquid directly therefrom, and said rotor having trailing edges for egress of the driving liquid substantially axially from the rotor, said nozzle means supplying liquid to said vortex chamber with a rotary momentum whereby a confined ring of liquid with a spiral motion of vortex flow is produced between said axially spaced end walls, said liquid engaging in its radial inward movement the leading edges of said vanes to rotate said rotor and to be axially discharged therefrom, and means responsive to the speed of the shaft for controlling the flow of liquid into the vortex chamber.

12. A hydraulic turbine for driving a shaft at high speed from a high pressure low velocity liquid supply, said turbine comprising means defining a ring shaped liquid inlet chamber having an inner annular wall, said wall being provided with a nozzle means, a rotor having a diameter of less than one-half the diameter of the inner annular wall and connected to said drive shaft for rotation therewith, and means defining an annular free vortex chamber between the annular wall and the periphery of the rotor, said last mentioned means including a pair of parallel flat axially spaced walls perpendicular to the axis of the rotor and defining the ends of said free vortex chamber, said rotor having vanes provided with leading edges adjacent the inner periphery of said vortex chamber to receive the freely flowing driving liquid directly therefrom, and said rotor having trailing edges for egress of the driving liquid substantially axially from the rotor, said nozzle means supplying liquid to said vortex chamber with a rotary momentum whereby a confined ring of liquid with a spiral motion of a free vortex is produced between said axially spaced end walls, said liquid engaging in its radial inward movement the leading edges of said vanes to rotate said rotor and to be axially discharged therefrom.

13. The combination with liquid at high pressure and low velocity of a hydraulic turbine for driving a shaft at high speed, said turbine comprising means defining a ring shaped liquid inlet chamber having an inner annular wall, said wall being provided with a nozzle means, a rotor having a diameter of less than one-half the diameter of the inner annular wall and connected to said drive shaft for rotation therewith, and means defining an annular vortex chamber between the annular wall and the periphery of the rotor the entire space of which vortex chamber is unobstructed and free of stator structure, said last mentioned means including a pair of parallel substantially flat axially spaced walls defining the ends of said vortex chamber, said rotor having vanes provided with leading edges adjacent the inner periphery of said vortex chamber to receive the freely flowing driving liquid directly therefrom, and said rotor having trailing edges for egress of the driving liquid substantially axially from the rotor, said nozzle means supplying liquid to said vortex chamber with a rotary momentum whereby a confined ring of liquid with a spiral motion of vortex flow is produced between said axially spaced end walls, said liquid engaging in its radial inward movement the leading edges of said vanes to rotate said rotor and to be axially discharged therefrom.

14. The combination with liquid at high pressure and low velocity of a hydraulic turbine for driving a shaft at high speed, said turbine comprising means defining a ring shaped liquid inlet chamber having an inner annular wall, said wall being provided with a nozzle means, a rotor having a diameter of less than one-half the diameter of the inner annular wall and connected to said drive shaft for rotation therewith, and means defining an annular vortex chamber between the annular wall and the periphery of the rotor the entire space of which vortex chamber is unobstructed and free of stator structure, said last mentioned means including a pair of parallel substantially flat axially spaced walls defining the ends of said vortex chamber, said rotor having vanes provided with leading edges adjacent the inner periphery of said vortex chamber to receive the freely flowing driving liquid directly therefrom, and said rotor having trailing edges for egress of the driving liquid substantially axially from the rotor, said nozzle means including a plurality of generally tangential passages for supplying liquid to said vortex chamber in generally tangential directions whereby a confined ring of liquid with a spiral motion of vortex flow is produced between said axially spaced end walls, said liquid engaging in its radial inward movement the leading edges of said vanes to rotate said rotor and to be axially discharged therefrom.

15. The combination with liquid at high pressure and low velocity of a hydraulic turbine for driving a shaft at high speed, said turbine comprising means defining a ring shaped liquid inlet chamber having an inner annular wall, said wall being provided with a nozzle means, a rotor having a diameter of less than one-half the diameter of the inner annular wall and connected to said drive shaft for rotation therewith, means defining an annular vortex chamber between the annular wall and the periphery of the rotor the entire space of which vortex chamber is unobstructed and free of stator structure, said last mentioned means including a pair of parallel substantially flat axially spaced walls defining the ends of said vortex chamber, said rotor having vanes provided with leading edges adjacent the inner periphery of said vortex chamber to receive the freely flowing driving liquid directly therefrom, and said rotor having trailing edges for egress of the driving liquid substantially axially from the rotor, said nozzle means supplying liquid to said vortex chamber with a rotary momentum whereby a confined ring of liquid with a spiral motion of vortex flow is produced between said axially spaced end walls, said liquid engaging in its radial inward movement the leading edges of said vanes to rotate said rotor and to be axially discharged therefrom, and means responsive to the speed of the shaft for controlling the flow of liquid into the vortex chamber.

16. The combination with liquid at high pressure and low velocity of a hydraulic turbine for driving a shaft at high speed, said turbine comprising means defining a ring shaped liquid inlet chamber having an inner annular wall, said wall being provided with a nozzle means, a rotor having a diameter of less than one-half the diameter of the inner annular wall and connected to said drive shaft for rotation therewith, and means defining an annular free vortex chamber between the annular wall and the periphery of the rotor, said last mentioned means including a pair of parallel flat axially spaced walls perpendicular to the axis of the rotor and defining the ends of said free vortex chamber, said rotor having vanes provided with leading edges adjacent the inner periphery of said vortex chamber to receive the freely flowing driving liquid directly therefrom, and said rotor having trailing edges for egress of the driving liquid substantially axially from the rotor, said nozzle means supplying liquid to said vortex chamber with a rotary momentum whereby a confined ring of liquid with a spiral motion of a free vortex is produced between said axially spaced end walls, said liquid engaging in its radial inward movement the leading edges of said vanes to rotate said rotor and to be axially discharged therefrom.

References Cited by the Examiner

UNITED STATES PATENTS

| 1,328,835 | 1/1920 | Kasley | 253—52 |
| 2,861,774 | 11/1958 | Buchi | 253—52 |
| 2,911,138 | 11/1959 | Birmann | 253—52 |

FOREIGN PATENTS

| 91,931 | 5/1897 | Germany. |

MARK NEWMAN, *Primary Examiner.*

HENRY F. RADUAZO, *Examiner.*